Sept. 28, 1965 C. L. AUSTIN ETAL 3,208,292
VARIABLE FORCE OSCILLATOR
Filed May 28, 1963 4 Sheets-Sheet 3

INVENTORS
CURTIS L. AUSTIN
ROBERT N. BATESON
BY *William C. Babcock*
ATTORNEY

United States Patent Office 3,208,292
Patented Sept. 28, 1965

1

3,208,292
VARIABLE FORCE OSCILLATOR
Curtis L. Austin and Robert N. Bateson, Minneapolis, Minn., assignors to General Mills, Inc., a corporation of Delaware
Filed May 28, 1963, Ser. No. 283,866
11 Claims. (Cl. 74—61)

This invention relates to a device for producing a vibratory force and imparting vibratory motion to an object, and more particularly to an oscillator or vibrator for use with a conveyor platform or the like, which can be adjusted to produce a variable vibratory force while the oscillator or vibrator is in operation.

Various types of oscillators or vibrators for causing a horizontal vibratory conveyor, screen, oven, or other similar vibratory device to vibrate, are well known in the art. Such devices normally include one or more rotatable eccentric weights which cause the conveyor or similar device to vibrate at a prescribed amplitude, as the weight is rotated. If two or more eccentric weights are used, they are usually caused to rotate in opposite directions by mounting them on two shafts which are rotated in opposite directions. A motor is provided for rotating one of the shafts in one direction, and appropriate gearing is provided for rotating the second shaft in the opposite direction.

Oscillators or vibrators of this nature have also been used in helical or vertical conveyors as well. According to the known state of the art, the oscillator or vibrator which produces the vibratory force is mounted either at the top of the helical conveyor, at the bottom of the conveyor, or at some point between the two ends of the conveyor, and it generally includes one or more eccentric weights mounted for relative rotation so as to produce a vibratory thrust force which causes the conveyor system to execute oscillations along a line extending helically. Material which is deposited in the bottom of the conveyor is conveyed along an ascending helical path. If two or more eccentric weights are used for creating the vibratory force, they are ofttimes mounted on two shafts and caused to rotate either in opposite directions, or in the same direction with respect to each other. The direction of rotation of the weights relative to each other depends upon the specific design of the conveyor system, the relative positioning of the springs with respect to the conveyor platform, the manner in which the conveyor pan is attached to the springs, the type of springs used, etc.

Oscillators for causing a conveyor platform to vibrate are generally attached either directly to the conveyor platform, hereinafter referred to as a one-mass system; or indirectly to the conveyor platform, by direct attachment to an intermediate frame to which the platform is attached, hereinafter referred to as a two-mass system. If the one-mass system is used, the conveyor platform is normally suspended by mounting it on the ends of at least two springs, the other ends of said springs being secured to a stationary support. The oscillator is attached directly to the conveyor platform, and as the oscillator is actuated, it imparts vibratory motion to the platform. On the other hand, if the two-mass system is used, the conveyor platform is normally suspended by mounting it on the ends of at least two springs, the other ends of said springs being secured to an intermediate frame support, the frame support in turn being suspended by mounting it on the ends of at least two additional springs, the other ends of said additional springs being secured to or positioned on a stationary support. The oscillator is attached directly to the intermediate frame support, and as the oscillator is actuated, a force is transmitted to the conveyor platform, and a vibratory motion is imparted to the platform, thus causing it to vibrate. Both of these systems are now well known in the art and will not be described in further detail. Such a two-mass system for example, is described and claimed in Patent No. 2,951,581 which issued on September 6, 1960. The present invention can readily be used in both systems.

Ofttimes it is desirable to increase or decrease the magnitude of the vibratory force created by an oscillator. According to the known state of the art, this is normally accomplished by changing the relative position of the eccentric weights with respect to each other, while the device is not in operation. This often requires the operator to interrupt the conveying or screening procedure, while the phase relationship of the weights with respect to each other is changed. Moreover, this often requires that the oscillator be at least partially disassembled so that the relative position of the weights might be changed.

Accordingly, one object of the present invention is to provide an improved oscillator for producing a vibratory force and imparting vibratory motion to an object.

Another object is to provide an oscillator having improved means for varying the effective vibratory force produced by the oscillator during operation.

A further object is to provide an oscillator whereby the vibratory force of the oscillator might be varied from a maximum magnitude to zero, or vice versa, while the oscillator is in operation.

A still further object is to provide an oscillator which is caused to vibrate by the rotation of eccentric masses, the phase relationship of the eccentric masses being variable with respect to each other, while the oscillator is in operation.

Another object is to provide an oscillator which may be used for imparting vibratory motion to either a horizontal conveyor or a vertical conveyor.

Still another object is to provide an actuator for varying the phase relationship of rotating eccentric masses of vibratory force to full complement of vibratory force. eccentric masses.

Another object is to provide an actuator for varying the phase relationship of two rotating eccentric weights with respect to each other, so that the component of vibratory force might be varied from full cancellation of vibratory force to full complement of vibratory force.

Other objects and advantages of this invention will become apparent from a consideration of the following specification and accompanying drawings. Before proceeding with a detailed description of the invention however, a brief description of it will be presented.

Preferably, the oscillator of the present invention is comprised of a housing which is attached either directly or indirectly to a conveyor platform, or other similar device. Two parallel shafts are rotatably mounted within a housing, and a pair of eccentrically weighted spur gears are connected to each shaft within the housing. One gear on each shaft is fixedly connected to the shaft, and the other gear on each shaft is rotatably mounted on the shaft in such a manner that the fixed gear on each shaft meshes with the rotatably mounted gear on the other shaft. The eccentrically weighted gears are positioned with respect to each other so that a desired phase relationship between said gears exists. An actuator, which includes a differential gearing unit, is operatively connected to each of the shafts, and it is provided with means for changing the phase relationship of the two eccentric weights on each shaft with respect to each other, while the shafts are rotating, so that the component of vibratory force might be varied from full cancellation of vibratory force to full complement of vibratory force.

A motor is provided for actuating the oscillator by rotating one of the shafts about its axis.

The invention will best be understood by reference to the following drawings, wherein.

Figure 1:
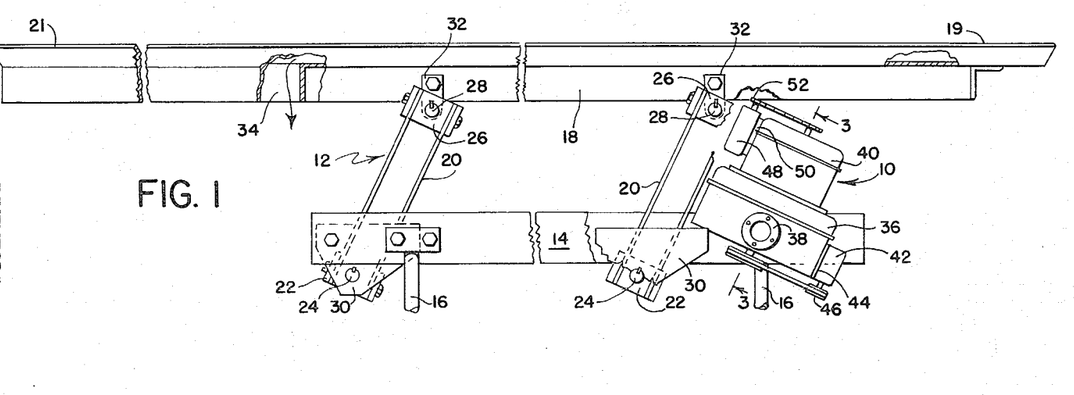
FIGURE 1 is a side elevational view with parts broken away, illustrating an oscillator attached to a horizontal vibratory conveyor.
Figure 2:
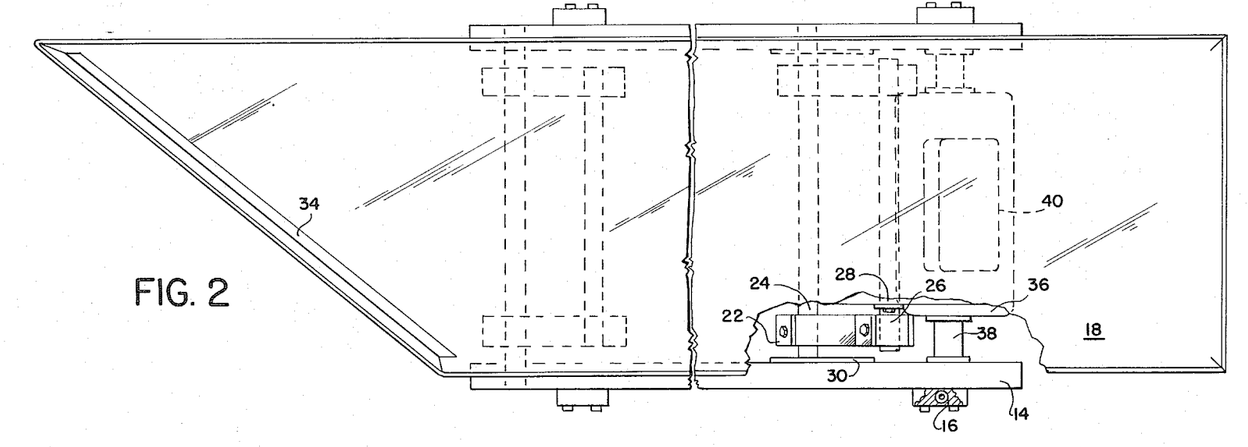
FIG. 2 is a top plan view with parts broken away illustrating the conveyor depicted in FIGURE 1.
Figure 6:
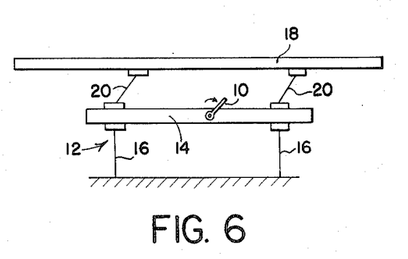
FIG. 6 is a schematic diagram of the device of FIGURE 1 in side elevation, which illustrates a two-mass system.
Figure 7:
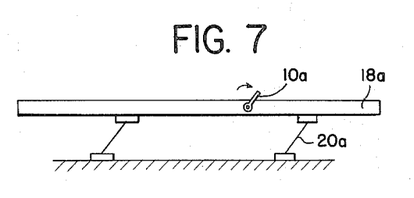
FIG. 7 is a similar schematic view illustrating a one-mass system.

FIGURE 1 illustrates an oscillator designated generally by reference numeral 10, mounted so as to transmit a vibratory force to a feeder or conveyor 12, thereby causing it to vibrate at a prescribed amplitude. It must be recognized, that although the invention is shown in conjunction with a feeder or conveyor, it might readily be used with other types of vibratory devices as well, such as vibratory screens, vibratory ovens, and the like. The system depicted in FIGURE 1 is a two-mass system, as described briefly hereinbefore, and is illustrated schematically in FIG. 6. As noted in FIG. 6, the oscillator 10 is attached directly to an intermediate support frame 14, and only indirectly to a feeder pan 18. The feeder pan 18 is mounted on the springs 20, and the support frame 14 is mounted on the spring legs 16. A vibratory force is transmitted to the feeder pan 18 as the oscillator is actuated, even though the frame 14 remains relatively stationary. FIG. 7 on the other hand, illustrates a one-mass system. The oscillator 10a is attached directly to the feeder pan 18a, and as the oscillator is actuated, a vibratory motion is imparted to the feeder pan 18. The feeder pan 18a is mounted on springs 20a, which are attached to a stationary support or floor.

Referring again to FIGURE 1, the support frame 14 is mounted on four legs 16, which form resilient springs. The feeder pan 18 is resiliently mounted with respect to the frame 14 by means of the leaf springs 20. The springs 20 are connected to the frame 14 by spring mounting blocks 22, which are fastened to the shafts 24 by appropriate means (such as welding, or keys), and to the pan 18 by spring mounting blocks 26, which are likewise fastened to the shafts 28. The shafts 24 are attached to the frame 14 by brackets 30, and the shafts 28 are attached to the feeder pan 18 by brackets 32. The feeder pan 18 has an inlet end 19 and an outlet end 21, and is provided with an elongate slot 34 at the outlet end, which permits material to be dispensed from the feeder pan.

The oscillator 10 is comprised of a first housing 36 which is mounted adjacent one end of the frame 14 and is attached thereto by means of mounting hubs 38. A second housing 40 is attached to the top of the housing 36. A first motor 42 is attached to the housing 36 by a mounting bracket 44, and is provided with a sheave 46. A second motor 48 is attached to the housing 40 by means of a mounting bracket 50 and is provided with a sheave 52.

Figure 3:
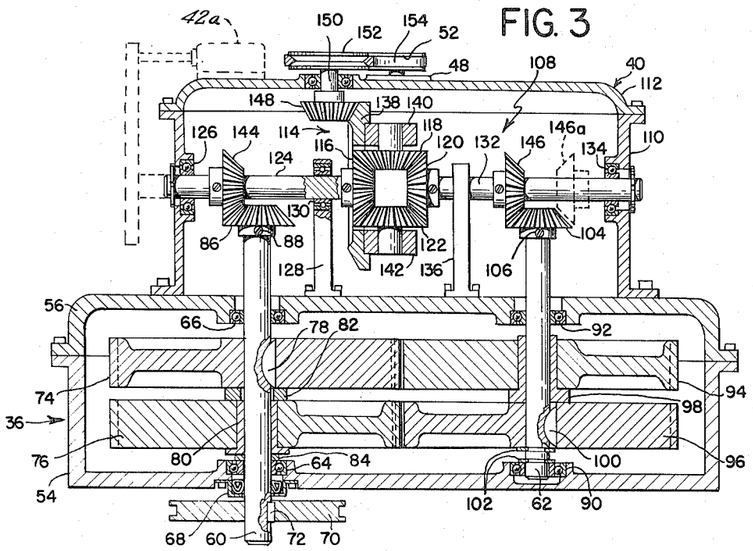
FIG. 3 is an enlarged sectional view of the oscillator taken along line 3—3 of FIGURE 1.

FIG. 3 illustrates the oscillator 10 in detail. The housing 36 is comprised of a main body 54, and a cover 56 secured thereto by appropriate means. Rotatably mounted within the housing are two parallel shafts, a first shaft 60, and a second shaft 62. The first shaft 60 is journaled in the body 54 and the cover 56 by bearings 64 and 66 respectively. The housing can be at least partially filled with a lubricating oil; an oil seal 68, seals the shaft 60 with respect to the housing, and prevents leakage of oil therefrom. A sheave 70 is attached to the shaft 60 by means of the key 72.

Mounted on the first shaft 60 is a pair of eccentric weights, comprised of a first spur gear 74, and a second spur gear 76. The gears are eccentrically weighted to provide an unbalanced mass, preferably, by using a gear having a portion removed therefrom between the axis and the periphery of the gear. This provides a spur gear having an eccentrically weighted portion which forms an integral part of the gear. Other ways of eccentrically weighting the spur gears are available as well, such as attaching a weight to one surface of the gear, the weight being placed off center with respect to the gear axis. By using the spur gears as shown in FIG. 3, a minimum amount of space is required, and the weights will not come loose from the gear. Other types of eccentric weights can be used as well. Different types will be described below. The first spur gear 74 is fixedly connected to the shaft 60 by means of a key 78. The second spur gear 76 is journaled on the shaft 60 so that it is freely rotatable with respect to it. A bearing 80 permits relative rotation between the shaft 60 and the gear 76. A spacer 82 separates the gears from each other, and a retaining ring 84 separates the bearing 80 from the body 54 of the housing. As noted in FIG. 3, the shaft 60 projects through the cover 56 and has secured thereto a bevel gear 86, by means of a set screw 88. As noted above, the opposite end of the shaft 60 has a sheave 70 secured thereto.

The second shaft 62 is rotatably mounted so that it is parallel to the shaft 60, and it is journaled in the body 54 and the cover 56 by bearings 90 and 92, respectively. Mounted on the shaft 62 is a second pair of eccentric weights comprised of a first spur gear 94, and a second spur gear 96. The spur gears 94 and 96 are eccentrically weighted in a manner similar to spur gears 74 and 76. All the spur gears are provided with a plurality of teeth on their peripheries. The eccentrically weighted spur gear 94 is rotatably mounted on the shaft 62 so that it is freely rotatable with respect to it. A bearing 98 permits relative rotation between the shaft 62 and the gear 94. The spur gear 94 is mounted on the shaft 62 in such a manner that it meshes with the first spur gear 74 fixedly connected to the shaft 60, and they are positioned with respect to each other so that the eccentrically weighted portions are phased 180° apart. The spur gear 96 is fixedly connected to the shaft 62 by means of a key 100, and it is separated from the body 54 of the housing by a pair of retaining rings 102. The spur gear 96 is mounted so that it meshes with the spur gear 76 on the shaft 60, and they are positioned with respect to each other so that the eccentrically weighted portions are phased 180° apart. The shaft 62 projects through the cover 56 in a manner similar to shaft 60, and has attached to its end a bevel gear 104, by means of a set screw 106.

The phase relationship of the eccentrically weighted spur gear 96 with respect to its related eccentrically weighted spur gear 94 on the shaft 62, can be varied, dependent upon the amplitude of vibration desired, by an actuator designated generally by reference numeral 108.

The actuator 108 is located within the housing 40 attached to the top of the housing 36, and it permits the operator of the feeder 12, to vary the amplitude of vibration by changing the phase relationship of the eccentric weights 94 and 96 with respect to each other, as well as the phase relationship of the weights 74 and 76 with respect to each other. By changing the phase relationship of the weights with respect to each other, the component of vibratory force can be varied from full cancellation of vibratory force to full complement of vibratory force.

Figure 8:
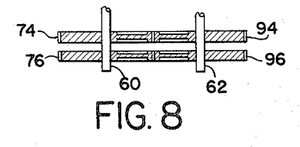
FIG. 8 is a schematic diagram which illustrates the position of the eccentric weights with respect to each other when a maximum amplitude of vibration is created.

As viewed in FIG. 3 for example, the eccentrically weighted spur gears 74 and 94 are phased 180° apart with respect to each other, and the eccentrically weighted spur gears 76 and 96 are likewise phased 180° apart with respect to each other. Note further, that the eccentrically weighted spur gears on each shaft, are phased 180° apart relative to each other. When the eccentric weights are in the position illustrated in FIG. 3, no vibratory force is created and no vibratory motion is imparted; in other words, a complete cancellation of vibratory force is achieved. By changing the phase relationship of the gears 94 and 96 relative to each other, a vibratory force is created which varies in magnitude from a minimum when the eccentric weights almost cancel each other out to a maximum when they fully complement each other. In this connection, note FIG. 8 which illustrates the position of the eccentric weights when a maximum amplitude of vibration is created. In other words, when the weights are in the position depicted in FIG. 8, they complement each other and produce a maximum vibratory force. It must be understood of course that although the two extremes of phase relationship of the weights have been described, the desired phase relationship between the eccentrically weighted spur gears 94 and 96 might be somewhere between zero degrees and 180° as well.

The actuator for changing the phase relationship of the weights with respect to each other is mounted in the housing 40, which is comprised of a main body 110, attached to the top of the housing 36 by appropriate means, and a cover 112 which is secured to the main body by appropriate means. The actuator includes a differential gearing unit (also referred to herein as a differential) designated generally by reference numeral 114, which is operatively connected to the shafts 60 and 62. The differential includes four bevel gears; a bevel gear 116, which is fixedly mounted on a horizontal shaft 124 and adapted to rotate about the horizontal axis of the shaft 124; a bevel gear 120, which is fixedly mounted on a horizontal shaft 132 and adapted to rotate about the horizontal axis of the shaft 132, the shaft 132 being substantially coaxial with the shaft 124; and bevel gears 118 and 122, which have their axes of rotation coaxial with each other, and perpendicular to the axes of rotation of the gears 116 and 120. A beveled ring gear 138 encircles the bevel gears 116–122 and is provided with two support brackets 140 and 142, which rotatably support the gears 118 and 122 respectively. The principle of differentials is well known in the art and will not be described in further detail. The shaft 124 is rotatably mounted in the housing 40 by means of a bearing 126, and in a support member 128 by means of a bearing 130; the shaft 132 is likewise rotatably mounted in the housing 40 by means of a bearing 134, and in a support member 136. The support members 128 and 136 are attached to the top of the housing 36 by appropriate means.

A bevel gear 144 is attached to the shaft 124 in such a manner that it meshes with the bevel gear 86 mounted on the shaft 60; and a bevel gear 146 is attached to the shaft 132 in such a manner that it meshes with the bevel gear 104 mounted on the shaft 62. A bevel gear 148 is mounted on a vertical shaft 150 in such a manner that it meshes with the ring gear 138. Secured to the opposite end of the shaft 150 is a sheave 152. The sheave 152 is caused to rotate about the axis of the shaft 150 by means of the motor 48, the sheave 52 and a belt 154. Rotation of the gear 148 about the axis of the shaft 150, causes the differential, i.e., the ring gear 138 and the bevel gears 118 and 122, to revolve about the axis of the horizontal shafts 124 and 132, said axis being substantially perpendicular to the axes of shafts 60 and 62. If desired, the housing 40 can be at least partially filled with a lubricating oil, and oil seals provided at the necessary places to prevent leakage of the oil from the housing.

Figures 4, 5:
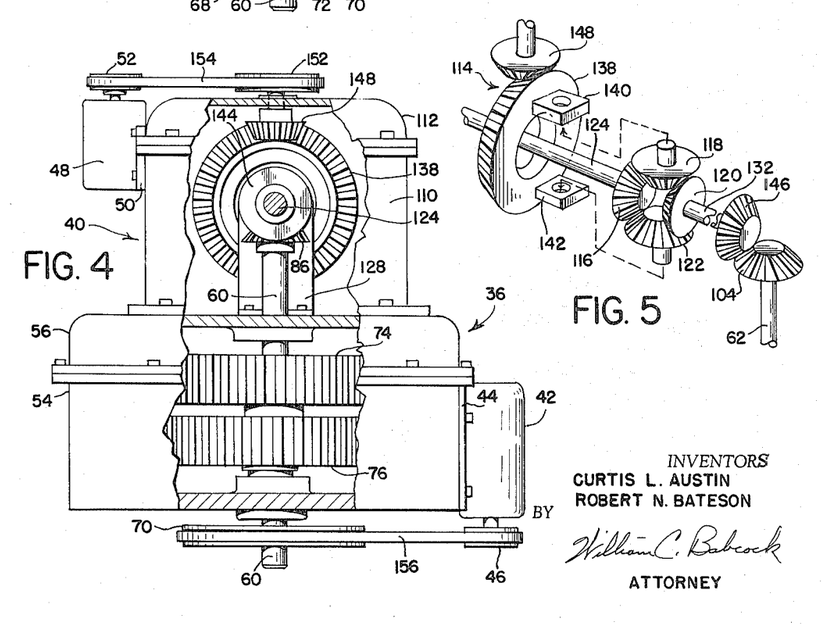
FIG. 4 is an end view of the oscillator shown in FIG. 3, with parts broken away.
FIG. 5 is an exploded perspective view illustrating parts of the oscillator.

As noted in FIG. 4, the sheave 70, mounted on shaft 60, is operatively connected to the motor 42 and the sheave 46 by means of a belt 156. The shaft 60 therefore serves as the drive shaft. It must be understood, that although the sheave 70 is mounted on the shaft 60 in this embodiment, the shaft 62 might be used as the drive shaft rather than the shaft 60, by extending the shaft 62 through the housing 36 and attaching the sheave 70 to it. Moreover, if desired, either the shaft 124 or the shaft 132 might be used as the drive shaft, by mounting the drive motor 42a on the housing 40 in such a manner that it is operatively connected to either the shaft 124 or the shaft 132, as shown for example in dotted lines in FIG. 3. By mounting the motor in this manner, both of the shafts 60 and 62 are driven by meshing engagement of the bevel gears 86 and 144, and gears 104 and 146.

In operation, when the motor 42 is energized, the sheave 70 and the shaft 60 are caused to rotate in one direction. The spur gear 74, since it is fixedly attached to the shaft 60, rotates in the same direction. The spur gear 94 rotatably mounted on the shaft 62, on the other hand, is caused to rotate in a counter direction relative to the spur gear 74. The horizontal shaft 124 is caused to rotate by virtue of the meshing engagement of the bevel gears 86 and 144, thereby actuating the differential 114, and causing the horizontal shaft 132 and the bevel gear 146 to rotate in an opposite direction than the shaft 124 and the gear 144. The shaft 62 is caused to rotate about its axis by virtue of the meshing engagement of the bevel gears 104 and 146, but in a counter direction relative to the shaft 60. The spur gear 96, which is fixedly connected to the shaft 62, is caused to rotate in the same direction as the shaft 62. The spur gear 76 rotatably mounted on the shaft 62 on the other hand, is caused to rotate in the opposite direction than the gear 96. The gears 74 and 76 thus rotate in the same direction, with respect to each other, and the gears 94 and 96 rotate in the same direction with respect to each other, but in the opposite direction with respect to the gears 74 and 76.

In order to change the phase relationship of the eccentrically weighted spur gears 94 and 96 with respect to each other while the shafts 60 and 62 are rotating, as well as when they are not rotating, the shaft 62 is caused to revolve with respect to the shaft 60, thereby changing the angular position of the shaft 62 with respect to the shaft 60. This revolution is accomplished by virtue of the differential gearing unit 114. By energizing the motor 48, the sheave 152 and the bevel gear 148 are caused to rotate about the axis of the shaft 150. Since the bevel gear 148 meshes with the ring gear 138, the ring gear 138 is caused to revolve about the horizontal axes of the shafts 124 and 132. As the ring gear 138 revolves, the support brackets 140 and 142, as well as the bevel gears 118 and 122, are likewise caused to revolve about the axes of the shafts 124 and 132. This revolution causes the angular position of the shaft 132 to be changed relative to the shaft 124, and consequently, the shaft 62 and the spur gear 96 are caused to revolve around the longitudinal axis of the shaft 62, as well as with respect to the spur gear 94, thereby changing the phase relationship of the eccentrically weighted spur gear 96 with respect to the gear 94 on the shaft 62; simultaneously, the phase relationship of the gears 74 and 76 with respect to each other is changed as well. As the phase relationship of these eccentrically weighted spur gears is changed, the magnitude of vibratory force created by the oscillator can be varied from a zero force to a maximum force, or in varying intermediate ranges, by a simple adjustment of the actuator.

If desired, the shafts 60 and 62 can be caused to rotate in the same direction relative to each other. This can be accomplished by changing the position of either the bevel gear 144 relative to the shaft 124, or the position of the bevel gear 146 relative to the shaft 132. As depicted by dotted lines in FIG. 3 for example, the gear 146 has been positioned as shown at 146a. The direction of rotation of the shaft 62 is now reversed, as compared to the direction of rotation when the gear 146 is positioned as shown in solid lines. When the oscillator is actuated, the shafts 60 and 62, as well as the gears 74 and 96 which are fixedly connected to said shafts, rotate in the same direction. The gears 76 and 94 on the other hand, by virtue of their meshing engagement with the gears 96 and 74 respectively, rotate about the axis of their respective shafts in an opposite direction than the gears 74 and 96. Note that the gears 74 and 94 are phased 180° apart relative to each other, and the gears 76 and 96 are likewise phased 180° apart relative to each other. By actuating the differential 114, the position of the gears 94 and 96 relative to each other, and the position of the gears 74 and 76 relative to each other, can be changed, as well as the direction of the output force produced by the oscillator.

Figure 9:
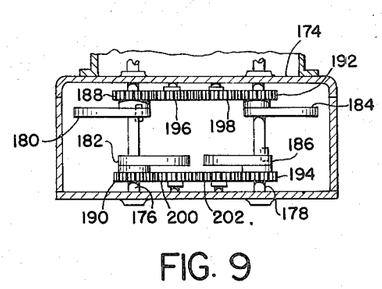
FIG. 9 is a partial sectional view illustrating a different manner of coupling the eccentric weights of an oscillator together.

Although the invention has been described in conjunction with eccentrically weighted spur gears for causing the vibration, other types of eccentric weights might be used as well. FIG. 9 for example, illustrates a different type of eccentric weight. In this embodiment, a pair of shafts 176 and 178 are rotatably mounted within a housing 174. The shaft 176 has a first eccentric weight 180 fixedly attached thereto, and a second eccentric weight 182 rotatably mounted thereon; and the shaft 178 has a first ececntric weight 184 rotatably mounted thereon, and a second eccentric weight 186 fixedly attached thereto. The weights 180, 182, 184, and 186 are provided with integral geared portions 188, 190, 192 and 194 respectively. The eccentric weights 180 and 184 are operatively connected together by means of spur gears 196 and 198, which mesh with the geared portions 192 and 194 on the weights 180 and 184. The weights 180 and 184 therefore rotate about the axis of their respective shafts in opposite directions. The eccentric weights 182 and 186 are likewise operatively connected together by means of spur gears 200 and 202, which mesh with the geared portions 190 and 194 on the eccentric weights 182 and 186. The weights 182 and 186 also rotate around the axis of their respective shafts in opposite directions. The phase relationship of the eccentric weights on each shaft with respect to each other, can be varied by means of a differential (not shown in FIG. 9) in a manner similar to that described hereinbefore in connection with the embodiment depicted in FIGS. 3 and 4. While FIG. 9 discloses a pair of spur gears disposed between each set of weights, it is envisioned that only one spur gear might be used, thereby causing the weights to rotate in the same direction relative to each other.

Figure 10:
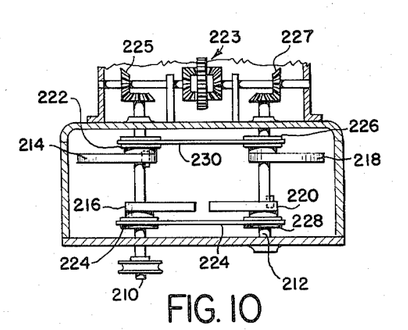
FIG. 10 is a partial sectional view illustrating a further embodiment of the invention.

FIG. 10 illustrates another embodiment whereby eccentric weights mounted on two different shafts, might be operatively connected to each other, and the phase relationship of the weights on each shaft varied relative to each other. The shaft 210 has two eccentric weights 214 and 216 mounted thereon, and the shaft 212 has two eccentric weights 218 and 220 mounted thereon, in a manner similar to that described above in connection with FIG. 9. The weights 214, 216, 218 and 220 are provided with integral sheave portions, 222, 224, 226 and 228 respectively. The weights 214 and 218 are operatively connected together by means of a flexible drive member 230, which might be a timing belt, chain, or the like (thereby providing a positive drive between said weights), and the weights 216 and 220 are operatively connected together by similar means. In this embodiment, no lubricant is required in the housing for lubrication purposes. In operation, when the shaft 210 and the weight 214 are rotated, the weight 218 is rotated in the same direction. The shaft 212 and the weight 220 are also rotated in the same direction, by means of a differential 223 similar to that described hereinbefore. The weight 216 likewise rotates in the same direction. It should be recognized that if desired, the shafts, and their respective weights, might be rotated in opposite directions as well, by crossing the belt 222 so that the weights 214 and 218 rotate in opposite directions, by crossing the belt 224, and by changing the relative position of the bevel gear 225 or 227, as described above in connection with FIG. 3.

Figure 11:
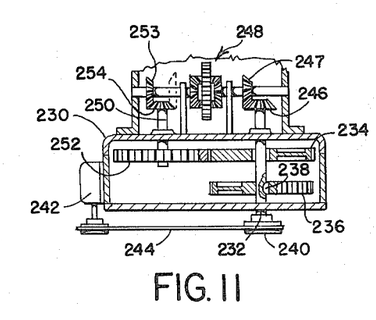
FIG. 11 is a partial sectional view illustrating a still further modification of the invention.

FIG. 11 illustrates another embodiment in which a single shaft 232 is rotatably mounted within a housing 230. A pair of eccentrically weighted spur gears are mounted on the shaft 232. A first gear 234 is rotatably mounted on the shaft 232, and a second gear 236 is fixedly connected to the shaft 232 by means of a key 238. Fixedly connected to one end of the shaft 232 is a sheave 240 which is operatively connected to a motor 242 by means of a belt 244, and fixedly connected to the opposite end of the shaft 232 is a bevel gear 246, which meshes with a bevel gear 247, thereby operatively connecting the shaft 232 to a differential gearing unit 248. The differential 248 is substantially the same as described above in connection with FIG. 3. A shaft 250 is rotatably mounted in the housing so that it is parallel to the shaft 232, and it is provided with a spur gear 252 which meshes with the eccentrically weighted spur gear 234. Note that the spur gear 252 and the gear 234 are substantially the same size. Attached to the opposite end of the shaft 250 is a bevel gear 254, which meshes with a bevel gear 253, thereby operatively connecting the shaft 250 to the differential 248.

In operation, when the motor 242 is energized, the shaft 232 is caused to rotate about its axis, thereby causing the eccentrically weighted spur gear 236 to rotate in the same direction about the axis of the shaft. As the shaft 232 is rotated, the differential 248 is actuated, and the shaft 250 is caused to rotate in an opposite direction relative to the shaft 232. The spur gear 234 is rotated in an opposite direction relative to the spur gear 252, but in the same direction as the spur gear 236. By revolving the differential 248, the phase relationship of the gears 234 and 236 with respect to each other can be varied, in a manner similar to that described above.

If desired, the gears 234 and 236 might be caused to rotate in opposite directions about the axis of the shaft 232, by changing the relative position of either the bevel gear 247 or the gear 253. By actuating the differential, the direction of the output force produced by the oscillator can be changed.

Figures 12, 13:
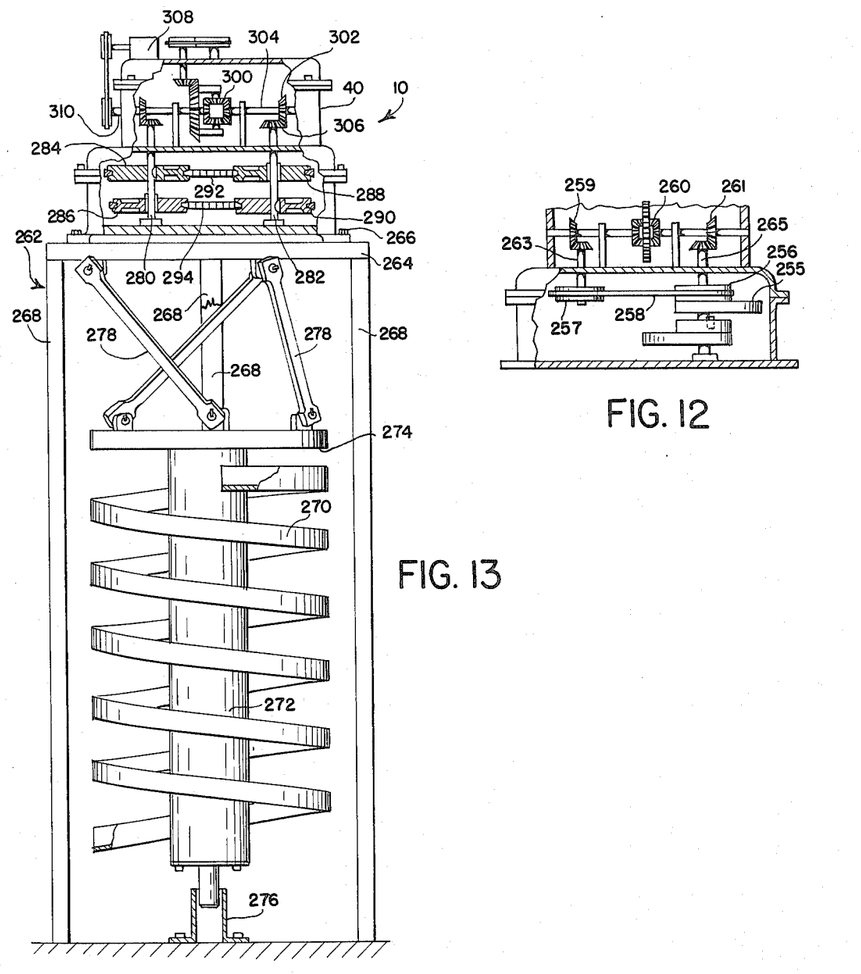
FIG. 12 is a partial sectional view illustrating another embodiment of the invention.
FIG. 13 is a side elevational view with parts broken away, illustrating an oscillator attached to a helical or vertical conveyor.

It should be recognized further that the weight 236 shown in FIG. 11, need not be a spur gear, since it does not mesh with any other gear. For example, it could merely be an eccentric weight similar to that shown in FIG. 9. Moreover, if desired, the spur gear 234 could be replaced by an eccentric weight 255 having a sheave portion 256, and the gear 252 replaced by a sheave 257 as shown in FIG. 12. A timing belt 258, operatively connects the sheave 257 and the weight 255 together. As stated hereinbefore, the relative positioning of the bevel gears 259 and 261, determines the direction of rotation of the shafts. As shown in FIG. 12, the shafts 263 and 265 are caused to rotate in the same direction. By revolving the differential 260, the phase relationship between the eccentric weights can be varied.

FIG. 13 illustrates the invention when used in conjunction with a helical or vertical conveyor, designated generally by reference numeral 262. In this embodiment, the oscillator 10 is attached to a support frame 264 by means of bolts 266, and the frame 264 is mounted on spring legs 268. The conveyor includes a helical trough 270 which is helically wound around and supported on a central support tube 272. The top of the tube 272 is attached to a support member 274 and the bottom of the tube is slidably and rotatably mounted in a bearing 276. The trough 270 is supported and guided for vibration along a helical path by means of springs 278 disposed obliquely between the frame support 264 and the support member 274. The springs 278 are attached to the frame 264 and the support member 274 by appropriate means, for example by welding or keys. Helical conveyors of this nature are generally well known to those skilled in the art.

The oscillator 10 is similar to the oscillators described hereinbefore. A pair of eccentrically weighted sheaves are mounted on each of the shafts 280 and 282. A first eccentrically weighted sheave 284 is fixedly attached to the shaft 280, and a second sheave 286 is rotatably mounted on the shaft 280. Similarly, a first eccentrically weighted sheave 288 is rotatably mounted on the shaft 282 and a second sheave 290 is fixedly attached to the shaft 282. The sheaves 284 and 288 are operatively connected together by a timing belt 292, and the sheaves 286 and 290 are operatively connected together by a timing belt 294, so that they all rotate about the axis of their respective shafts in the same direction. The weighted sheaves 284 and 288 are positioned with respect to each other so that they are phased 180° apart; and the weighted sheaves 286 and 290 are positioned with respect to each other so that they are phased 180° apart.

A differential gearing unit 300 is operatively connected to each of the shafts 280 and 282, in a manner similar to that described hereinbefore. Note, however, that the bevel gear 302, is mounted on the shaft 304 so that it is positioned between the bevel gear 306 mounted on the shaft 282, and the housing 40. Note further, that the motor 308 for actuating the oscillator, is mounted on the housing 40 and is operatively connected to the shaft 310 by appropriate means.

In operation, when the motor 308 is energized, it causes the shaft 310 to rotate about its axis. The shafts 280 and 282 are caused to rotate about their respective axes in the same direction, by means of the bevel gears and the differential 300. The eccentrically weighted sheaves also rotate about the axis of their respective shafts, in the same direction as the shafts. Note that the sheave 284 is keyed to the shaft 280, and it drives the sheave 288 in the same direction by means of the belt 292. On the other hand, the sheave 290 is keyed to the shaft 282, and it drives the sheave 286 in the same direction by means of the belt 294. Thus, in this embodiment, both the shafts 280 and 282, as well as all the weighted sheaves, rotate in the same direction.

When the amplitude of vibration of the conveyor is to be changed, the differential is actuated and caused to revolve about the axis of the shaft 304, and the angular position of the shafts 280 and 282 relative to each other is changed. As a result, the phase relationship of the weighted sheaves 284 and 286 with respect to each other, as well as the phase relationship of the weighted sheaves 288 and 290 with respect to each other, is changed.

As the eccentrically weighted sheaves rotate about the axis of their respective shafts, impulses are transmitted to the tube 272 and the trough 270, thus causing the conveyor to vibrate along a generally helical path. Material which is deposited in the lower portion of the trough 270 will be conveyed to the upper portion of the trough, in a manner well known in the art. The magnitude of the vibratory force created by the oscillator can be varied, by actuating the differential gearing unit so as to change the phase relationship of the eccentrically weighted sheaves.

The variable force oscillator described herein, can be used for producing a vibratory force and imparting vibratory motion to different types of devices, such as a horizontal or vertical conveyor, or a gyratory sifter. By a simple adjustment, the amplitude of vibration of the vibrating body can be varied from a zero magnitude to a predetermined maximum magnitude, by cancelling the vibratory force in its entirety, or by complementing the vibratory force by a simple adjustment while the oscillator is being actuated.

In the above description and the attached drawings, a disclosure of the principles of this invention is presented, together with some of the embodiments by which the invention may be carried out.

Now therefore we claim:

1. An oscillator comprising a housing, at least one shaft rotatably mounted in said housing, at least one pair of eccentric weights, means for rotatably mounting a first weight on said shaft, means for fixedly connecting the second weight to said shaft, said weights being rotatable about the shaft axis in either direction with respect to each other, means for rotating said shaft about its axis, means for changing the phase relationship of said weights with respect to each other while the shaft is rotating, said means including a differential gearing unit, means for operatively connecting said differential to one end of the shaft, means including the differential for rotating the first weight about the shaft axis.

2. The combination of claim 1 wherein the means for rotating the first weight about the shaft axis causes said weight to rotate about said axis in the same direction as the second weight.

3. The combination of claim 1 wherein means are provided for revolving the differential about an axis perpendicular to the shaft axis, said revolution causing the phase relationship of the two weights with respect to each other to be changed.

4. An oscillator comprising a housing, a pair of parallel shafts rotatably mounted in said housing, a pair of eccentric weights mounted on each shaft, means for mounting a first weight of each pair of weights on its respective shaft so that the first weights are phased 180° apart with respect to each other, means for maintaining said first weights in phased relationship, means for mounting the second weight of each pair of weights on its respective shaft so that said second weights are phased 180° apart with respect to each other, means for maintaining said second weights in phased relationship, said parallel shafts being rotatable in either direction relative to each other, and the weights on each shaft being rotatable in either direction relative to each other, means for varying the phase relationship between the first and second weights of each pair of weights, said means including a differential gearing unit, means for mounting said differential relative to the housing so that it is operatively connected to one end of each shaft, means for rotating one of said shafts about its axis thereby actuating the differential, the other shaft being caused to rotate about its axis in response to actuation of the differential, and means for revolving the differential about an axis normal to the axis of the parallel shafts thereby causing the phase relationship of the two weights on each shaft to be varied with respect to each other while the shafts are rotating.

5. An oscillator comprising a housing, a first shaft rotatably mounted in said housing, a first pair of eccentric weights, means for fixedly connecting a first weight of said weights to said shaft, means for rotatably mounting the second weight on said shaft, a second shaft rotatably mounted in said housing parallel to the first shaft, a second pair of eccentric weights, means for rotatably mounting a first weight of said second pair of weights on said second shaft, said first weights of each pair of weights being mounted on their respective shafts so that they are phased 180° apart relative to each other, means for operatively connecting said first weights to each other so that they maintain their phased relationship, means for fixedly connecting the second weight of said second pair of weights to said second shaft, said second weights of each pair of weights being mounted on their respective shafts so that they are phased 180° apart relative to each other, means for operatively connecting said second weights to each other so that they maintain their phased relationship, said weights permitting the shafts to be rotated in either direction with respect to each other, a differential gearing unit, means for operatively connecting said differential to each of said shafts, means for rotating one of said shafts thereby actuating the differential and causing the other shaft to rotate, means including the differential for varying the phase relationship between the first and second weights of each pair of weights while the shafts are rotating, and means for revolving said differential about an axis normal to the axis of the parallel shafts thereby causing the phase relationship of the two weights on each shaft to be varied with respect to each other.

6. The combination of claim 5 wherein the means for maintaining said first weight of each pair of weights in phased relationship includes at least one spur gear positioned between said weights for operatively connecting said first weights together, and the means for maintaining said second weight of each pair of weights in phased relationship includes at least one spur gear positioned between said weights for operatively connecting said second weights together.

7. The combination of claim 5 wherein the means for maintaining said first weights of each pair of weights and said second weights of each pair of weights in phased relationship includes a first belt which operatively connects the first weights together, and a second belt which operatively connects the second weights together.

8. An oscillator comprising a housing, a pair of parallel shafts rotatably mounted in said housing, a pair of spur gears mounted on each shaft, means for eccentrically weighting each of said gears, means for mounting a first gear of each pair of gears on its respective shaft so that said first gears mesh with each other and the eccentric means of said gears are phased 180° apart with respect to each other, means for mounting the second gear of each pair of gears on its respective shaft so that said second gears mesh with each other and the eccentric means of said second gears are phased 180° apart with respect to each other, said gears permitting the shafts to be rotated in either direction with respect to each other, a differential gearing unit, means for operatively connecting said differential to one end of each of said shafts, means for rotating one of said shafts thereby actuating the differential and causing the other shaft to rotate, means including the differential for varying the phase relationship between the first and second gears of each pair of gears while the shafts are rotating, and means for revolving said differential about an axis normal to the axis of the parallel shafts thereby causing the phase relationship of the two gears on each shaft to be varied with respect to each other.

9. An oscillator comprising a housing, a first shaft rotatably mounted in said housing, a first pair of eccentrically weighted spur gears, means for fixedly connecting a first gear to said shaft, means for rotatably mounting the second gear on said shaft, a second shaft rotatably mounted in said housing parallel to the first shaft, a second pair of eccentrically weighted spur gears, means for rotatably mounting a first gear of said second pair of gears on said second shaft so that it meshes with the first gear on the first shaft and the eccentrically weighted portions of said first gears are phased 180° apart relative to each other, means for fixedly connecting the second gear of said second pair of gears to said second shaft so that it meshes with the second gear on the first shaft and the eccentrically weighted portions of said second gears are phased 180° apart relative to each other, a differential gearing unit, means for operatively connecting said differential to the ends of each of said shafts by means including a pair of coaxial shafts mounted in end to end alignment and gearing means mounted on each shaft, said gearing means causing the first and second shafts to rotate when the coaxial shafts are rotated, means for rotating one of said shafts about its axis thereby actuating the differential and causing the other shaft to rotate about its axis, said two pairs of gears being caused to rotate in opposite directions about the axis of their respective shafts, means including the differential for varying the phase relationship between the first and second weighted gears of each pair of gears while the shafts are rotating, and means for revolving said differential about an axis normal to the axis of the parallel shafts thereby causing the phase relationship of the two gears on each shaft to be varied with respect to each other.

10. An oscillator comprising a housing, a pair of parallel shafts rotatably mounted in said housing, a pair of eccentric weights mounted on each shaft, means for mounting a first weight of each pair of weights on its respective shaft so that said first weights are phased 180° apart with respect to each other, means for maintaining said first weights in phased relationship, means for mounting the second weight of each pair of weights on its respective shaft so that said second weights are phased 180° apart with respect to each other, means for maintaining said second weights in phased relationship, said shafts and said weights being rotatable in either direction with respect to each other, a differential gearing unit, means for mounting said differential on a pair of coaxial shafts, the axes of said shafts being normal to the axis of the pair of shafts, means for operatively connecting said differential to one end of each of said parallel shafts, means for rotating each parallel shaft about its respective axis, a motor for rotating each shaft of said pair of coaxial shafts about its respective axis thereby actuating the differential, each shaft of the pair of parallel shafts being caused to rotate about its axis in response to rotation of said pair of coaxial shafts, and means including the differential for varying the phase relationship between the first and second weights of said pair of weights while the shafts are rotating.

11. An oscillator comprising a housing, a first shaft rotatably mounted in said housing, a first pair of eccentrically weighted spur gears, means for fixedly connecting a first gear to said shaft, means for rotatably mounting the second gear on said shaft, a second shaft rotatably mounted in said housing parallel to the first shaft, a second pair of eccentrically weighted spur gears, means for rotatably mounting a first gear of said second pair of gears on said second shaft so that it meshes with the first gear on the first shaft and the eccentrically weighted portions of said first gears are phased 180° apart relative to each other, means for fixedly connecting the second gear of said second pair of gears to said second shaft so that it meshes with the second gear on the first shaft and the eccentrically weighted portions of said second gears are phased 180° apart relative to each other, a differential gearing unit, means for operatively connecting said differential to the ends of each of said shafts, means for rotating one of said shafts about its axis thereby actuating the differential and causing the other shaft to rotate about its axis, said means causing the first and second shafts to rotate in opposite directions about their respective axes, said two pairs of gears being caused to rotate in opposite directions with respect to each other about the axis of their respective shafts, means for rotating the first and second spur gear on each shaft in the same direction about its shaft axis, means including the differential for varying the phase relationship between the first and second weighted gears of each pair of gears while the shafts are rotating, and means for revolving said differential about an axis normal to the axis of the parallel shafts thereby causing the phase relationship of the two gears on each shaft to be varied with respect to each other.

References Cited by the Examiner

UNITED STATES PATENTS

| | | | |
|---|---|---|---|
| 2,206,386 | 7/40 | Bernhard | 74—61 |
| 2,309,172 | 1/43 | De Kanski | 74—61 X |
| 2,445,175 | 7/48 | Hittson | 74—61 |
| 3,076,549 | 2/63 | Becker | 209—367 |

FOREIGN PATENTS

| | | |
|---|---|---|
| 106,136 | 4/27 | Austria. |
| 415,309 | 8/34 | Great Britain. |

BROUGHTON G. DURHAM, *Primary Examiner.*

UNITED STATES PATENT OFFICE
CERTIFICATE OF CORRECTION

Patent No. 3,208,292                           September 28, 1965

Curtis L. Austin

It is hereby certified that error appears in the above numbered patent requiring correction and that the said Letters Patent should read as corrected below.

Column 2, line 39, for "vibratory force to full complement of vibratory force." read --    an oscillator, without stopping the rotation of the --.

Signed and sealed this 12th day of April 1966.

(SEAL)
Attest:

ERNEST W. SWIDER                              EDWARD J. BRENNER
Attesting Officer                                   Commissioner of Patents